Dec. 26, 1944. P. L. CRITTENDEN 2,366,004

COMPRESSOR VALVE

Filed Oct. 29, 1942

INVENTOR
Philip L. Crittenden
BY
ATTORNEY

Patented Dec. 26, 1944

2,366,004

UNITED STATES PATENT OFFICE 2,366,004

COMPRESSOR VALVE

Philip L. Crittenden, Edgewood, Pa., assignor to The Westinghouse Air Brake Company, Wilmerding, Pa., a corporation of Pennsylvania Application October 29, 1942, Serial No. 463,756

1 Claim. (Cl. 251—144)

This invention relates to pressure actuated valves, and more particularly to a discharge valve for a fluid compressor or the like.

In the construction of a fluid compressor of relatively simple and inexpensive design suitable for use in transportation service and light industrial work, it is desirable that the compressor valve elements be carefully devised, not only to provide maximum efficiency in operation, but also to facilitate ease of assembly or replacement of parts. The principal object of my invention is to provide an improved valve assembly, suitable for use as a discharge valve in a compressor of the type referred to, and comprising a valve element of frusto-conical form, a spring, and a single carrier element for retaining both valve and spring in proper alignment with a suitable beveled seat carried in the compressor head.

Figure 1:
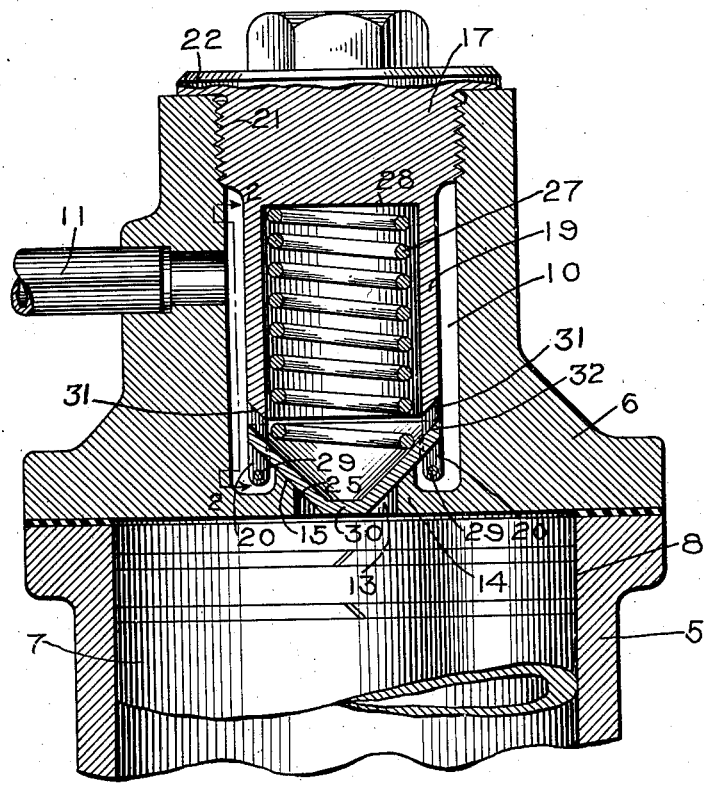
Figure 2:
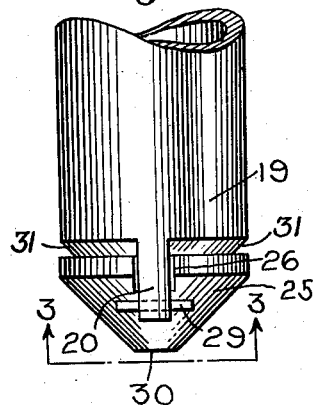
Figure 3:
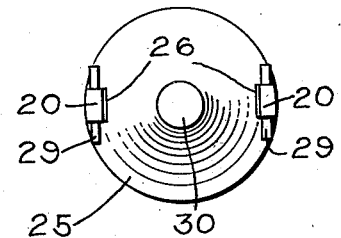

Other objects and advantages of the invention will appear in the following more detailed description thereof, taken in connection with the accompanying drawing, in which Fig. 1 is a fragmentary sectional view of a compressor head assemblage embodying a preferred form of valve mechanism constructed according to the invention, and Figs. 2 and 3 are side and end views, respectively, of the carrier and valve elements shown in Fig. 1.

Illustrated in Fig. 1 is the upper portion of a compressor including a cylinder 5, a cylinder head 6 which may be bolted or otherwise secured thereto, and a piston 7, which is arranged for operation within a suitable compression chamber or bore 8 formed in the cylinder 5. It will be understood that the compressor is adapted to be provided with suitable inlet valve means, not shown, through which air or other fluid can be supplied to the bore 8 for compression by the piston 7.

Formed in the compressor head 6 is a vertically disposed chamber 10 which communicates with a discharge pipe 11 and is also adapted for communication with the compression bore 8 by way of a port 13, which is surrounded by an annular valve seat rib 14 carried by the head. As shown in Fig. 1, a beveled seat 15 is formed in the seat rib 14.

According to the invention, a combination spring and valve carrier member 17 is disposed in the chamber 10, the upper end of the carrier member having screw-threaded connection with the cylinder head 6. The carrier member 17 includes a tubular portion 19, which is disposed in concentric spaced relation with respect to the wall of the chamber 10 and terminates in a pair of extensions or lugs 20. Formed on the upper end of the carrier member 17 is a suitable screw-thread 21 that is engageable with a corresponding thread formed on the head 6 at the outer end of the chamber 10. An annular flange 22 disposed adjacent the thread 21 on the carrier member is adapted to abut the upper end of the head for defining the proper assembled position of the associated elements.

Loosely held between the opposite lug portions 20 of the carrier member is a frusto-conical valve element 25, in which are formed lateral recesses 26 for receiving the lug portions. A coil spring 27 is interposed between a wall 28 formed in the carrier member 17 and the valve element 25 for normally urging the latter into seating engagement with the beveled seat 15, when the various elements are assembled as shown in Fig. 1 of the drawing. Pins 29 are inserted through suitable apertures in the lug portions 20 of the carrier member 17 for retaining the valve element 25 before the carrier member is mounted in place, or after its removal from the head 6. In order to minimize any tendency of the conical valve element to shift to a somewhat oblique position when it is lifted from the seat 15 during rapid operation, inclined or beveled stop surfaces 31 are formed on the end of the tubular portion 19 of the carrier member, between the projecting lugs 20. The beveled stop surfaces 31 are adapted to be engaged by the complementary inner face 32 of the conical valve element when it reaches the upper limit of movement away from the seat 15, so that proper centering and alignment of the valve element during operation of the compressor is thus insured.

It will be observed that when the valve element 25 is in seated position, it remains out of engagement with the pins 29, while the flat apex 30 thereof occupies a substantial portion of the space within the port 13 of the compressor head 6, thus minimizing the undesired clearance space above the compressor piston 8 which would otherwise tend to impair full volmetric efficiency of the compressor. The frusto-conical contour of the valve element 25 provides a further advantage in facilitating free flow of air under pressure from the compression chamber 8 without causing any abrupt change in direction.

It will now be apparent that the improved discharge valve assembly constructed in accordance with my invention embodies means for facilitating assembly of the associated elements of a compressor and for preventing damage to or loss of the valve element or spring when the parts are removed for inspection, the construction and arrangement being such as to permit the use of a frusto-conical valve to insure adequate volumetric efficiency of the compressor and relatively unimpeded flow of fluid under pressure from the compression chamber to the discharge conduit.

Having now described my invention, what I claim as new and desire to secure by Letters Patent, is:

A discharge valve assembly for a fluid compressor, comprising the combination with a valve casing having a valve chamber containing an inlet forming an elevated conical valve seat and having an outlet, of a valve carrier member having a body portion secured in screw-threaded relation with said casing and a cylindrical portion extending longitudinally into said valve chamber in parallel spaced relation with respect to the wall thereof, said cylindrical portion of the carrier member terminating in beveled valve stop surfaces and having a pair of relatively narrow parallel lugs disposed adjacent and outwardly of said elevated valve seat, a hollow frusto-conical valve element having its greatest diameter of substantially the same diameter as that of the cylindrical portion and having internal beveled surfaces conforming to the bevel of the stop surfaces, said valve element having lateral slots for loosely receiving said lugs when said valve element is assembled thereon, whereby said valve element is adapted to be freely guided on said lugs without frictional engagement with other surfaces and to be centered by engagement with said stop surfaces when unseated, pins secured to the ends of said lugs for retaining said valve element on said carrier member, and a spring interposed between said body portion and said valve element for urging the latter into seating engagement with said conical valve seat.

PHILIP L. CRITTENDEN.